Nov. 11, 1924.
1,515,387

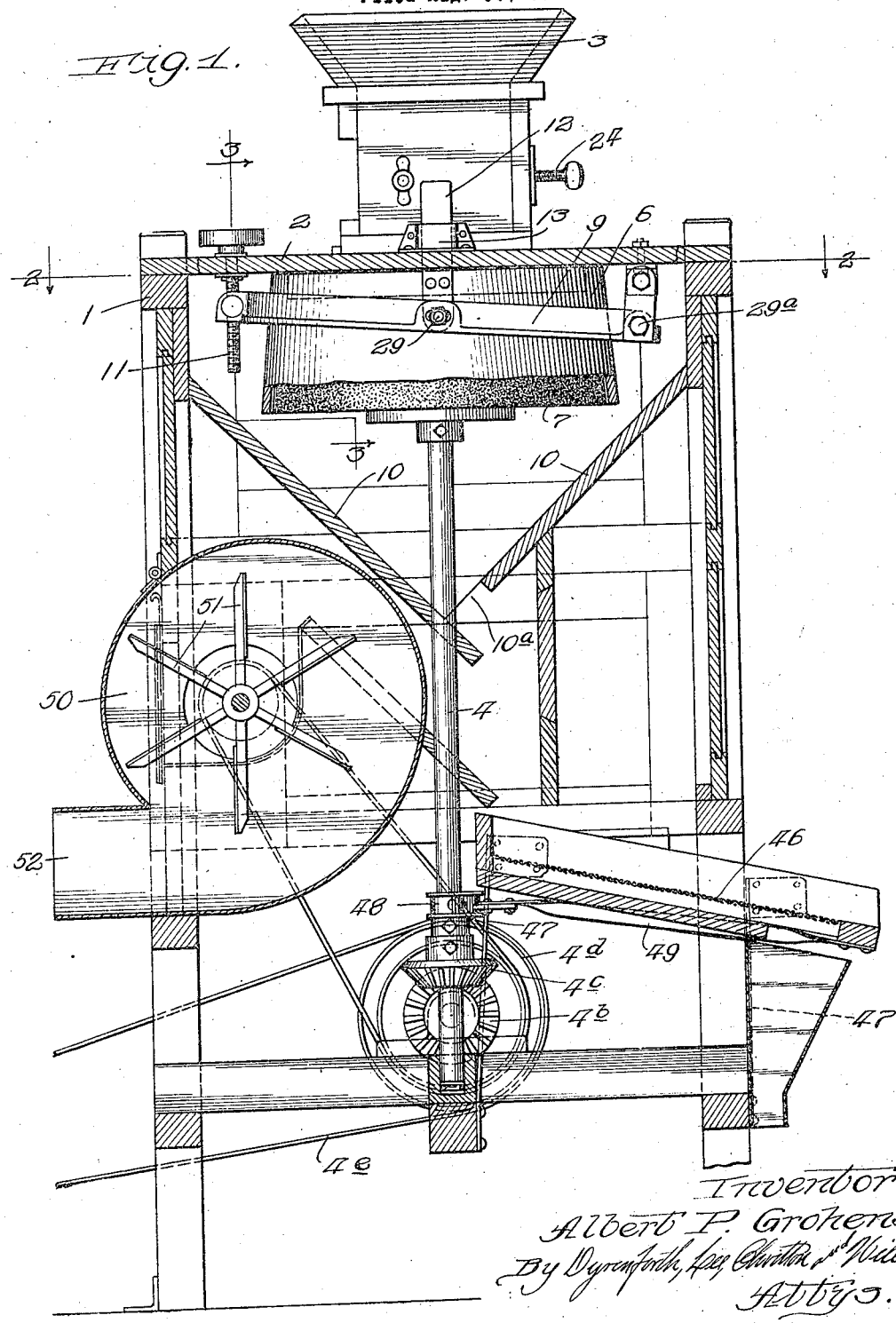

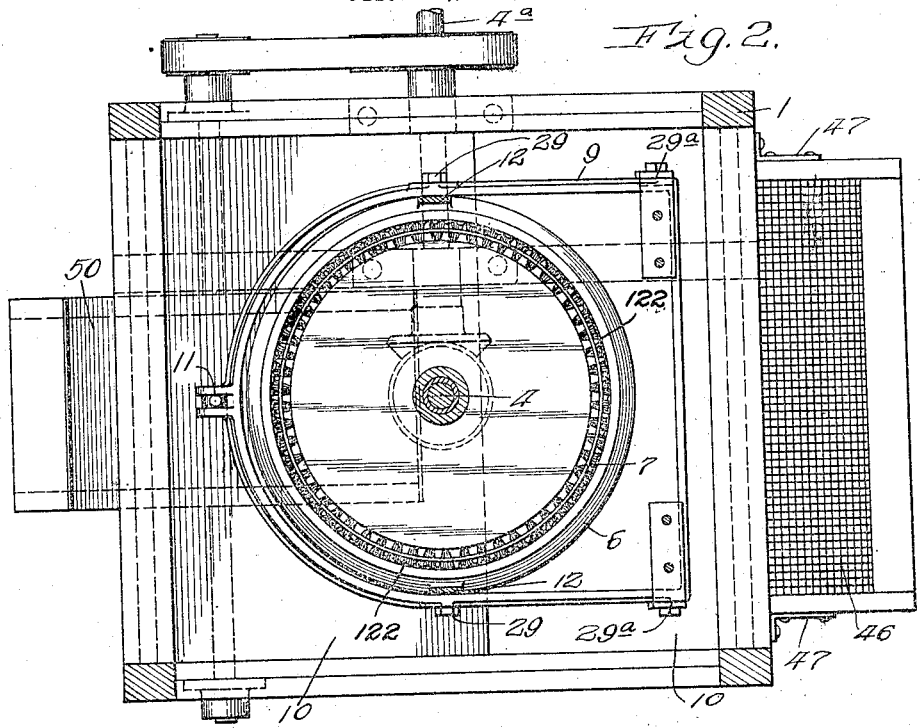
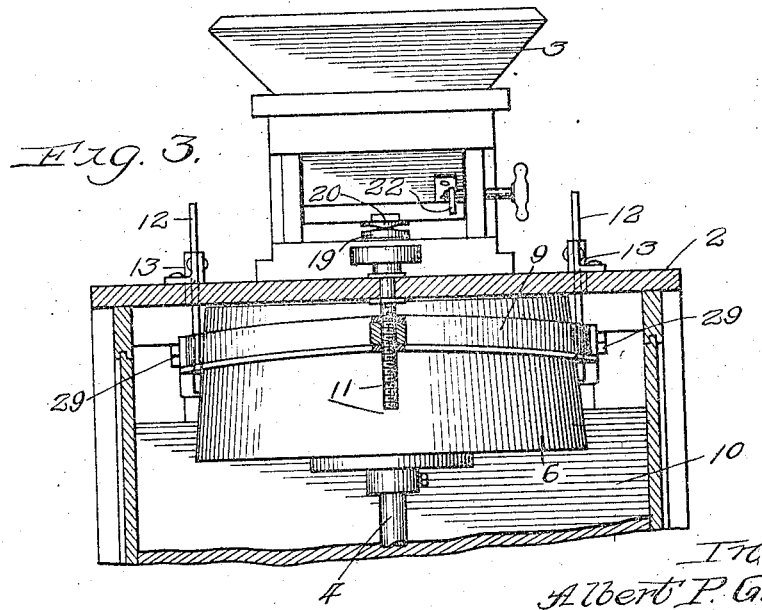

A. P. GROHENS

BLANCHING MACHINE

Filed Aug. 30, 1923   3 Sheets-Sheet 3

Inventor:
Albert P. Grohens

Patented Nov. 11, 1924.

1,515,387

UNITED STATES PATENT OFFICE.

ALBERT P. GROHENS, OF MARSHALL, MICHIGAN.

BLANCHING MACHINE.

Application filed August 30, 1923. Serial No. 660,153.

*To all whom it may concern:*

Be it known that I, ALBERT P. GROHENS, a citizen of the United States, residing at Marshall, in the county of Calhoun and State of Michigan, have invented new and useful Improvements in Blanching Machines, of which the following is a specification.

This invention relates to improvements in blanching machines for removing the skins from nut kernels, and is here shown embodied in a machine especially adapted for blanching or hulling peanuts. It is obvious, however, that the machine may be used for removing the skins from, or for cleaning peanuts or other nuts.

The machine here shown is of the same general character as the hulling mechanism described in applicant's Patent No. 831,663, granted September 25, 1906, but the machine here described has many improvements. The present machine is provided with means for adjusting the casing surrounding the brush. The automatic feeding device is also new and novel and permits the adjustment of the feed to regulate the rate of feed and also give the proper adjustment depending upon the size of the peanuts operated upon. By means of the automatic feed a uniform flow may be produced, so that the machine will always operate at its best efficiency without clogging. Other improvements, features and advantages of my invention will appear more fully as I proceed with my specification.

In that form of device embodying the features of my invention shown in the accompanying drawings—

Figure 1 is a vertical sectional view of the complete machine,

Fig. 2 is a view taken as indicated by the line 2 of Fig. 1,

Fig. 3 is a view taken as indicated by the line 3 of Fig. 1,

Figure 4:
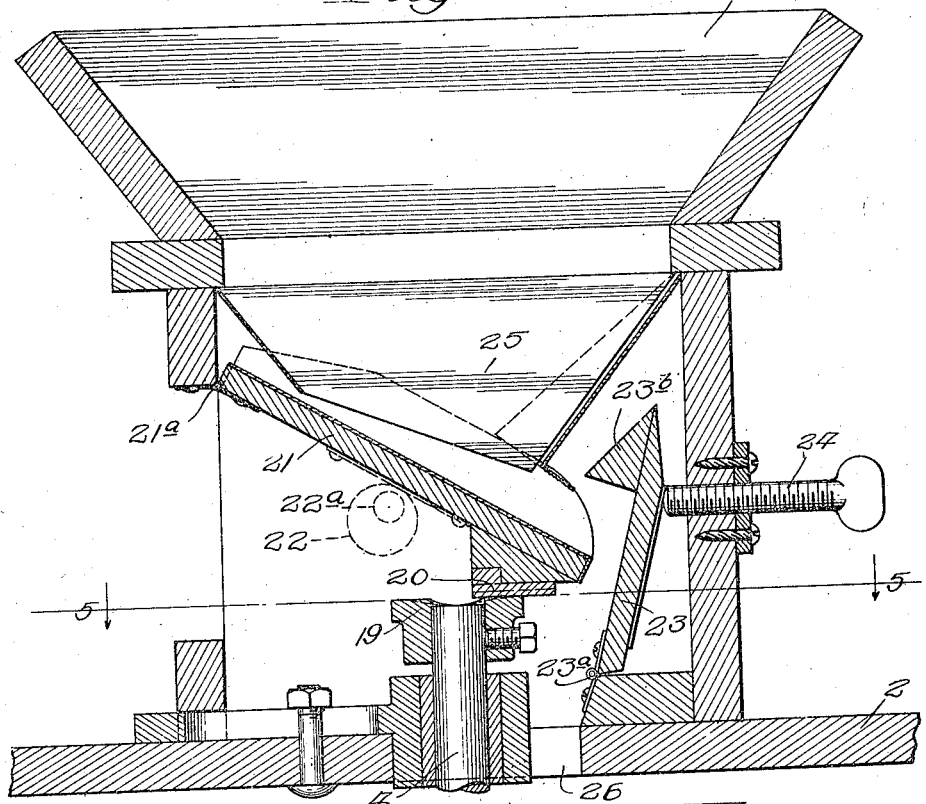
Fig. 4 is a vertical sectional view on an enlarged scale of the feeding mechanism.
Figure 5:
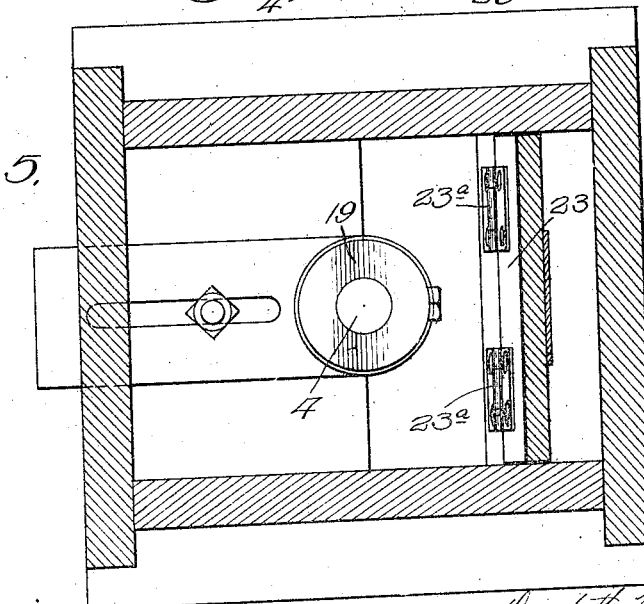
Fig. 5 is a view taken as indicated by the line 5 of Fig. 4.

As shown in the drawings, 1 indicates the frame or casing of the blancher. 2 is the top or deck thereof. 3 indicates a hopper adapted to contain the nuts to be blanched. 4 indicates a vertically arranged rotatable shaft, adapted to be driven by the drive shaft $4^a$ operating through the bevel-gears $4^b$ and $4^c$ respectively. The shaft $4^a$ may be driven in any suitable manner, as by the belt wheel $4^d$ driven by the belt $4^e$.

The shaft 4 carries near its upper end a frustro-conical blanching brush 7 similar to the brush shown in my prior Patent No. 831,663. Surrounding the blanching brush 7 is a frustro-conical hulling cylinder or rubbing disk or tub 6, which is corrugated or provided with ribs on the inside, as indicated by 122. The taper of the hulling cylinder corresponds to the taper of the brush. Means are provided for adjusting the hulling cylinder with respect to the brush in order to give any desired adjustment between these two members. The hulling cylinder 6 is provided with two diametrically arranged pintles 29 supported in slots provided in the yoke 9. The yoke 9 is hinged at one end at $29^a$, as shown, and its other end is provided with a nut operating on the screw 11 so that adjustment of the screw 11 operates to raise or lower the hulling cylinder 6. The hulling cylinder 6 also has attached to it two vertical flat steel guiding members 12, adapted to slide in the guides 13 for the purpose of centering the hulling cylinder.

I will now describe the feeding mechanism: The bottom of the hopper 3 is provided with a sheet steel chute 25. Arranged below the mouth of the chute 25 is a flapper or vibrator 21, comprising a slanting board hinged at $21^a$. The lower end of the board 21 is provided with a fibre cam shoe 20 adapted to be engaged by the rotary shaker cam 19 mounted on the upper end of the shaft 4. It will be seen that by means of this construction, rotation of the cam 19 will cause a rocking of the board 21 to assist in the flow of peanuts from the hopper. Across the lower end of the board 21 is provided a butterfly valve 23, comprising a substantially vertical board hinged at $23^a$. The upper edge of the board 23 is provided with a strip $23^b$ to form a shoulder to prevent the passage of peanuts over its upper edge. An adjusting screw 24 is provided to change the angularity of the board 23 to regulate the flow of peanuts as desired. 22 indicates a shut-off cam or eccentric mounted on a shaft $22^a$, adapted to be rotated to raise the board 21 to shut off the flow of peanuts from the hopper. In normal operation the peanuts issue from the feeding mechanism through the passage 26, whence they fall on the top of the brush which is made slightly convex so that they will move to the outer edge and then pass down between the bristles on the brush and the hulling cylinder 6. As they pass between the brush and the hulling cylinder, the skins are removed. The hulling cylinder is adjusted, as desired, by means of the screw 11.

The nuts and skins fall from the brush on to the slanting boards 10, which direct them to the opening 10ª. From the opening 10ª they fall on to the screen 46, which is supported by four vertical spring members 47. The screen 46 is given reciprocatory movement by means of an eccentric strap 48, operating on an eccentric mounted on the shaft 4. The eccentric strap 48 is connected to the screen by means of the bar 49. The screen is provided with a mesh of a proper size to separate the hearts of the peanuts from the nut meats. During the passage of the meats and skins from the opening of 10ª to the screen 46, they pass in front of the opening 50, in which a suction is provided by means of the fan 51. This suction removes from the meats the skins, hulls and other like impurities and discharges them out of the opening 52.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possibe in view of the prior art.

What I claim as new and desire to secure by Letters Patent, is:

1. In a device of the character described, a frustro-conical brush; a frustro-conical hulling cylinder surrounding said brush; and means for adjusting said brush and hulling cylinder with respect to each other, said means including a yoke spanning the hulling cylinder and pivotally attached thereto, a pivotal mounting for one end of said yoke, and means for vertically adjusting the other end of said yoke.

2. In a device of the character described, a frustro-conical brush; a frustro-conical hulling cylinder surrounding said brush, and provided with ribs or corrugations on its inner surface; and means for adjusting said brush and hulling cylinder with respect to each other, said means including a yoke spanning the hulling cylinder and pivotally attached thereto, a pivotal mounting for one end of said yoke, and means for vertically adjusting the other end of said yoke.

3. In a device of the character described, a frustro-conical brush; a frustro-conical hulling cylinder surrounding said brush; and means for adjusting said hulling cylinder with respect to said brush, said means including a yoke spanning the hulling cylinder and pivotally attached thereto, a pivotal mounting for one end of said yoke, and means for vertically adjusting the other end of said yoke.

4. In a device of the character described, a rotatable frustro-conical brush; a frustro-conical hulling cylinder surrounding said brush; a hopper arranged above said brush; means for feeding nuts from said hopper to the top of said brush; and means for adjusting said hulling cylinder with respect to said brush, said means including a yoke spanning the hulling cylinder and pivotally attached thereto, a pivotal mounting for one end of said yoke, and means for vertically adjusting the other end of said yoke.

5. In a device of the character described, a rotatable frustro-conical brush, supported on a vertical axis; a frustro-conical hulling cylinder surrounding said brush; and means for relative vertical adjustment of said hulling cylinder with respect to said brush, said means including a yoke spanning the hulling cylinder and pivotally attached thereto, a pivotal mounting for one end of said yoke, and means for vertically adjusting the other end of said yoke.

6. In a device of the character described, a rotatable frustro-conical brush, supported on a vertical axis; a frustro-conical hulling cylinder surrounding said brush; and means for adjusting said hulling cylinder vertically with respect to said brush, said means including a yoke spanning the hulling cylinder and pivotally attached thereto, a pivotal mounting for one end of said yoke, and means for vertically adjusting the other end of said yoke.

In witness whereof, I have hereunto set my hand and seal this 8th day of August, 1923.

ALBERT P. GROHENS. [L. S.]